United States Patent
Scaduto

(10) Patent No.: US 7,245,368 B2
(45) Date of Patent: Jul. 17, 2007

(54) SAMPLE CHAMBER FOR MICROSCOPY

(75) Inventor: Russell C. Scaduto, Hummelstown, PA (US)

(73) Assignee: C & L Instruments, Hummelstown, PA (US)

( * ) Notice: Subject to any disclaimer, the term of this patent is extended or adjusted under 35 U.S.C. 154(b) by 389 days.

(21) Appl. No.: 10/812,336

(22) Filed: Mar. 29, 2004

(65) Prior Publication Data

US 2004/0189988 A1    Sep. 30, 2004

Related U.S. Application Data

(60) Provisional application No. 60/459,120, filed on Mar. 31, 2003.

(51) Int. Cl.
*G01N 21/01* (2006.01)

(52) U.S. Cl. .................................................... 356/244

(58) Field of Classification Search ................ 356/246, 356/440, 244
See application file for complete search history.

(56) References Cited

U.S. PATENT DOCUMENTS

| | | | |
|---|---|---|---|
| 2,942,520 A | | 6/1960 | Rose |
| 3,614,243 A | * | 10/1971 | Harvey ........................ 356/246 |
| 3,726,597 A | * | 4/1973 | Dvorak et al. ............... 356/244 |
| 4,338,024 A | | 7/1982 | Bolz et al. |
| 4,343,552 A | * | 8/1982 | Blades ........................ 356/339 |
| 4,395,492 A | | 7/1983 | Rees |
| 4,580,901 A | | 4/1986 | Goldsmith |
| 4,707,086 A | | 11/1987 | Dahan et al. |
| 4,734,372 A | | 3/1988 | Rotman |
| 4,748,124 A | | 5/1988 | Vogler |
| 4,804,267 A | | 2/1989 | Greenfield |
| 4,974,952 A | | 12/1990 | Focht |
| 5,140,169 A | * | 8/1992 | Evens et al. ................. 250/576 |
| 5,170,286 A | * | 12/1992 | Zimmerberg et al. ....... 359/398 |
| 5,241,415 A | | 8/1993 | Argentieri et al. |
| 5,407,638 A | * | 4/1995 | Wang ....................... 422/82.09 |
| 5,414,556 A | | 5/1995 | Focht |
| 5,552,321 A | | 9/1996 | Focht |
| 5,579,107 A | * | 11/1996 | Wright et al. ............... 356/336 |
| 5,665,599 A | | 9/1997 | Minuth |
| 5,726,751 A | | 3/1998 | Altendorf et al. |
| 5,905,271 A | * | 5/1999 | Wynn .......................... 250/573 |
| 6,046,806 A | | 4/2000 | Thompson |
| 6,521,451 B2 | | 2/2003 | Potter |
| 6,657,718 B1 | * | 12/2003 | Petersen et al. ............. 356/246 |

OTHER PUBLICATIONS

Jacobs, C.R. et al., "Differential effect of steady versus oscillating flow on bone cells", Journal of Biomechanics 31, Jul. 2, 1998, pp. 969-976.

Frangos, John A. et al., "Flow Effects on Prostacyclin Production by Cultured Human Endothelial Cells", Science Journal, Mar. 22, 2985, pp. 1477-1479, vol. 227.

* cited by examiner

*Primary Examiner*—Gregory J. Toatley, Jr.
*Assistant Examiner*—Isiaka O. Akanbi
(74) *Attorney, Agent, or Firm*—McNees Wallace & Nurick LLC

(57) ABSTRACT

A chamber is provided having a main body and one or two optical plates that are held to the main body by O-rings or other seal forming elements using forces created by vacuum and/or chemical adhesion. The chamber, in which a sample well holds a specimen, is formed from the optical elements that function as observation windows, being held to the main body from one side only by the seal forming elements.

19 Claims, 6 Drawing Sheets

SAMPLE CHAMBER FOR MICROSCOPY

CROSS-REFERENCE TO RELATED APPLICATIONS

This application claims the benefit of U.S. Provisional Application No. 60/459,120 filed Mar. 31, 2003.

BACKGROUND OF THE INVENTION

The present invention relates generally to optical sample chambers useful for optically observing or monitoring specimens or samples or compounds, including reaction mixtures therein. More particularly, the present invention relates to optical sample chambers, which are commonly used with microscopes for visual observation of specimens.

A number of sealed chambers for viewing specimens microscopically or spectroscopically have been developed. Such chambers, in which specimens and sample fluids may be introduced, include fluid or sample inlet and outlet passages, and at least one optical site at which a specimen or sample may be optically observed either by the naked eye or by any number of optical measuring instruments. In contrast to optical cuvettes, which are merely walled containers having no fluid or sample flow means, dynamic sample or specimen chambers that include fluid or sample inlet and outlet passages generally comprise a chamber compartment defined between one or more covers, coverslips, or lenses, snap-rings, O-retainers and O-rings. Pumps or syringes may be incorporated to direct flow into or from the chamber for either continuous or staged investigation. Some examples of dynamic sample chambers are provided below.

U.S. Pat. No. 2,942,520 discloses a tissue culture device used with a microscope comprising retaining plates, a chamber defined within gasket, and coverslips over the chamber. The gasket forms a fluid-tight seal. Hypodermic needles can be inserted through the gasket into the chamber for additional removal of fluid.

U.S. Pat. No. 3,726,597 discloses a device having an O-ring over a steel plate and cover glasses, which are sealed by a snap-ring. A needle extends through a spacer ring and the cover glasses. The syringe may be used to fill or evacuate the chamber. The rings can be connected to a pump to sustain a flow rate of 1 cc per hour. This device is also commonly referred to as the Dvorak-Stotler chamber.

U.S. Pat. No. 4,338,024 discloses a flow analyzer for blood cells, which includes a body with a passageway. A microscope is focused on an examination area and the passageway. Flow characteristics are controlled by adjusting the fluid pressure in containers either automatically or by adjusting the static heights thereof.

U.S. Pat. No. 4,580,901 discloses a fluid sample cell for spectroscopic analyses. The sample cell can be placed horizontally or vertically. The cell includes a fluid tight compartment. The sample is introduced through an entry conduit and exits through conduit at a lower valve. On the passage to the sample chamber, the sample passes through a trough-shaped entry pocket, which extends longitudinally along the length of the channel. A clip is used to maintain a single cell in place.

U.S. Pat. No. 4,707,086 discloses a stage assembly for thermodynamic study under a microscope. The assembly includes a sealed outer envelope having optical windows, and a sealed inner envelope having an experimental volume. The temperature, pressure, and the volume can be controlled and monitored.

U.S. Pat. No. 4,804,267 discloses a system for microscopic analysis of fluids, which includes a flow cell having a U-shaped body, and a central well. There is a central viewing chamber at the bottom of the well. There are two retainers made of glass or plastic, which enclose a central element with a cutout for a display chamber. A pump conveys a sample through tubing in the sample cell so that a portion enters the display chamber as a thin film of fluid.

U.S. Pat. No. 4,748,124 discloses a compartmentalized cell culture device, in which two sheets of gas-permeable, liquid-impermeable material sandwich a third sheet of material, which is selectively permeable to a class of molecules. The culture chamber is retained in the compressed state by a plurality of screws, which are evenly spaced about the circumference of the rings and hold the culture chamber tightly together in a sandwich type array.

U.S. Pat. No. 4,974,952 discloses a perfusion chamber composed of a sandwich between a bottom slide, a central aperture and a top slide. The sandwich forming the chamber is held together by two blocks and retaining screws. Samples are introduced or withdrawn from a port.

U.S. Pat. No. 5,170,286 discloses a perfusion chamber composed of two coverslips separated by a metal plate spacer. A top plate and bottom plate hold the two coverslips and plate spacer together. Two O-rings form seals between the top and bottom plates and the two coverslips. The chamber is held together using locking pins secured on four posts.

Therefore, what is needed is a chamber that can be quickly and easily assembled and disassembled while providing a user of the chamber with optimal access and viewing capabilities.

SUMMARY OF THE INVENTION

The present invention is directed to a chamber apparatus that can be used for cell perfusion, incubation, hybridization or for other applications in which it is desirable to hold an optical element, to which cells or on which a chemical surface is formed, by one surface. The main components of the chamber apparatus preferably include a main body, one or more sealing elements and one or more optical elements. The optical elements can preferably include cover slips, lenses, slides, plates or any other suitable type of element, such as prisms and wedges. The optical elements can be composed of a variety of materials including almost any type of plastic or glass or any other suitable material. The sealing elements are preferably O-rings. However, other types of sealing elements can also be used such as washers and gaskets.

One embodiment of the present invention is directed to a sample chamber for a test specimen. The sample chamber includes a main body and at least one optical element. The at least one optical element has a surface for holding a test specimen and is operatively connected to the main body by a force applied to the surface holding the test specimen. The sample chamber also includes at least two sealing elements, which sealing elements are configured and disposed between the main body and the at least one optical element to operatively connect the at least one optical element to the main body. Finally, the main body, the at least one optical element and the at least two sealing elements form a sample well for a test specimen upon the at least one optical element being operatively connected to the main body.

Another embodiment of the present invention is directed to a sample chamber for a test specimen. The sample chamber includes a main body and at least one optical element. The at least one optical element having a surface for holding a test specimen and being operatively connected to the main body by a force applied to the surface for holding the test specimen. The sample chamber also includes a means for applying a force to a continuous portion of the surface for holding the test specimen of the at least one optical element to operatively connect the at least one optical element to the main body. The means for applying a force has at least one sealing element. The at least one sealing element is configured and disposed between the main body and the at least one optical element. The main body, the at least one optical element and the at least one sealing element form a sample well upon the at least one optical element being operatively connected to the main body by the means for applying a force.

Still another embodiment of the present invention is directed to a chamber having a body, and at least one optical element. The at least one optical element is operatively connectable to the body upon a force being applied to a planar surface of the at least one optical element. The chamber also includes a connecting arrangement to connect the at least one optical element to the body upon a vacuum force being applied to the connecting arrangement and the planar surface of the at least one optical element. The connecting arrangement has at least one pair of sealing elements disposed substantially concentrically to form a space between the at least one pair of sealing elements. The at least one pair of sealing elements are disposed between the body and the at least one optical element. The body, the at least one optical element and the at least one pair of sealing elements form a chamber upon a vacuum force being applied to the connecting arrangement and the planar surface of the at least one optical element to connect the at least one optical element to the body.

One advantage of the present invention is that the specimen chamber provides optimal visual access to a specimen within the chamber over the entire dimension of the chamber.

Another advantage of the present invention is that the specimen chamber provides for rapid fluid exchange with minimal mixing times.

Still another advantage of the present invention is that the specimen chamber includes disposable cover slips as chamber observation windows, which are easily exchangeable to facilitate maintenance of a clean optical path and cell and organelle attachment.

A further advantage of the present invention is that the specimen chamber has an observation window with its outermost surface accessible for direct contact to another surface over its entire length.

A still further advantage of the present invention is that an optical element being used as an observation window in a sample chamber can be held in place on only one surface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention is a chamber for perfusion or observation in which one or more of the optical elements composing the window or windows of the chamber are held by one surface, preferably an interior surface or a facing surface, to the body of the chamber. Several embodiments of the present invention are shown in the accompanying figures and will be discussed in greater detail below.

The chamber apparatus or assembly of the present invention preferably has a main body, one or more sealing elements and one or more optical elements. The optical elements are preferably used as observation windows and can include coverslips, lenses, slides, plates or any other suitable type of device or element such as prisms and wedges. The optical elements can be composed of a variety of materials, but are preferably a type of plastic or glass. Some examples of types of plastic that can be used for the optical elements include acrylic and polystyrene. Some examples of types of glass that can be used for the optical elements include fused silica, BK7, Pyrex and borosilicate.

In another embodiment of the present invention, the optical element can be coated with a material or substance that permits electrical conductance on the surface of the optical element. For example, indium tin oxide (ITO) is a one type of optical coating material that permits the surface of the optical element to conduct electricity. In yet another embodiment of the present invention, the optical element can be coated with a material or substance that enhances the optical properties of the optical element. The optical enhancement coating may be an antireflective coating that is used to lower the occurrence of light scattering or a coating that enhances the transmission properties of the optical element.

The sealing elements are preferably O-rings, but can be any suitable type of sealing element including washers and gaskets. The sealing elements can be composed of or made from nitrile (commonly known as Buna), silicon, Teflon, Viton or any other material that permits a satisfactory seal to be formed. In another embodiment of the present invention, the sealing element can also be a coating or material, such as a suitable adhesive, applied to the either the optical element, the surface of the body facing the optical element or both. In this embodiment the sealing element is also used to hold the optical element in position with respective to the main body. In a further embodiment of the present invention, the body of the chamber can receive a treatment that permits the body to form a seal with the optical element without the use of a separate sealing element.

The body can be composed of or fabricated from stainless steel, plastic materials, such as acrylic or delrin, or anodized aluminum. In addition, the body can include one or more ports for probes, such as temperature probes, to access the chamber and an integrated heating element for temperature control in the chamber.

Figure 1:
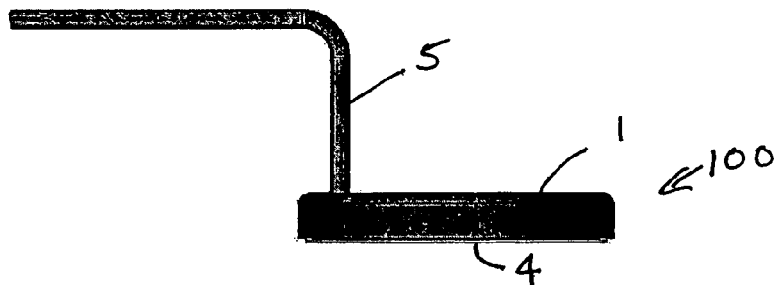
FIG. 1 illustrates a front view of one embodiment of the chamber of the present invention.
Figure 2:
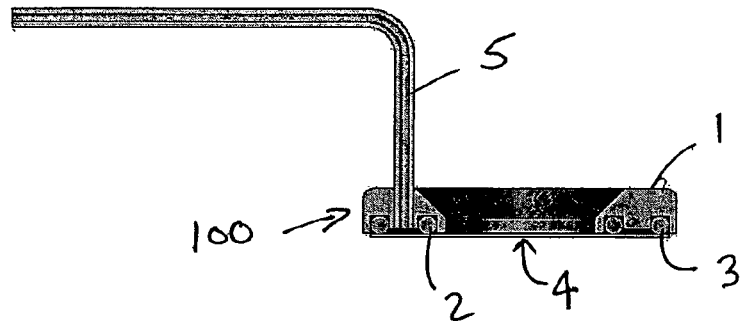
FIG. 2 illustrates a cross-sectional view of the chamber of FIG. 1.
Figure 3:
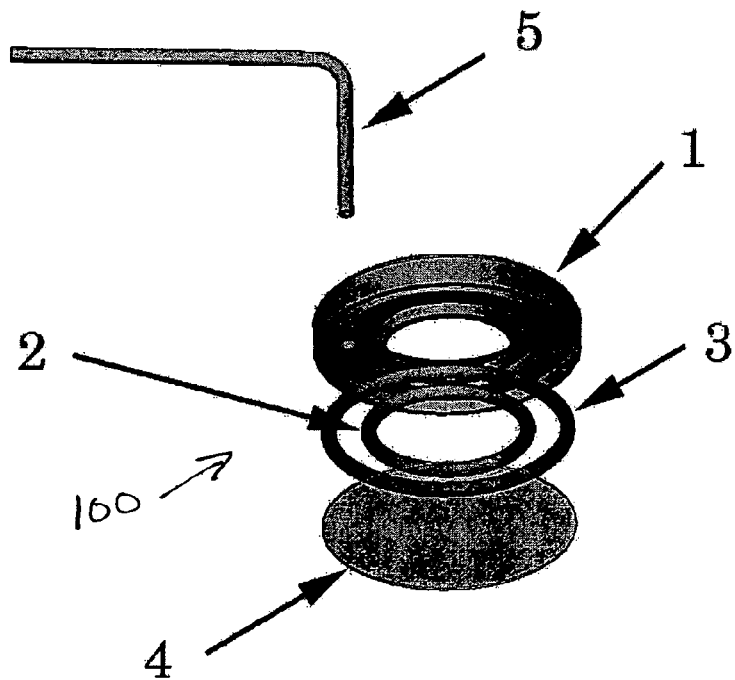
FIG. 3 illustrates an exploded view of the chamber of FIGS. 1 and 2.

A first embodiment of the chamber of the present invention is shown in FIGS. 1–3. The embodiment of the chamber shown in FIGS. 1–3 can be known or referred to as an "Open-Top" chamber 100. Chamber 100 has a main body 1, which is preferably cylindrical, a coverslip 4, which is preferably round and is positioned adjacent to the lower or bottom surface of the body 1 and two substantially concentric sealing members 2, 3, which are preferably round O-rings and are positioned between the coverslip 4 and the body 1. The coverslip 4 is sealingly connected to the body 1 and sealing members 2, 3 to form chamber 100 using a vacuum or suction force applied between the sealing members 2, 3. In another embodiment of the present invention, the sealing members 2, 3 could be pre-attached to the body 1, the coverslip 4, or both to aid in the assembly or formation of the chamber 100.

The vacuum force is applied through a vacuum port connection 5 that is connected to a vacuum or suction force. The body 1 has an aperture or passageway through which the vacuum port connection 5 passes to access the space between the sealing members 2, 3. The vacuum port connection 5 can be tubing connected to the body 1 by an adhesive to provide the vacuum force. Another type of connector, such as a hose barb device could also serve as a vacuum port connection 5 to which the vacuum force is applied. The application of the vacuum force to vacuum port 5 permits the evacuation of air from the space between the sealing members 2, 3, thereby forming a suction connection that compresses sealing elements 2, 3 and holds coverslip 4 in a position adjacent to the body to form chamber 100. The strength of the vacuum force and the area of the space between the two O-rings can be adjusted to vary the strength of the suction connection that holds the coverslip 4 in position. In one embodiment, a suction connection force of about 5 pounds is generated by a vacuum of −23 inches of mercury. However, it is to be understood that different suction connection forces and vacuum forces can be used. By applying the vacuum force or suction connection force to the interior surface of the coverslip 4, i.e. the surface of the coverslip 4 that faces the body 1, a user of chamber 100 has total access, including mechanical access, to the bottommost portion of the chamber 100, i.e. the coverslip 4.

The chamber 100 can be used or operated as follows, biological cells or test specimens can be attached or maintained on the interior surface of the coverslip 4 in the area within the innermost sealing member 2 for analysis or experimentation. The body 1 is then placed over the coverslip 4 and the vacuum force is applied to connect the coverslip 4 to the body 1, as discussed above, to form a sample well. The sample well is preferably the area between the coverslip 4 and the body 1 sealed by the sealing members 2, 3. The sample well does not receive any of the vacuum force holding the coverslip 4 in position and as such, the sample contained in the sample well is not in contact with the space under vacuum, which could alter or tamper with the experiment or analysis that is being conducted in the sample well.

Figure 4:
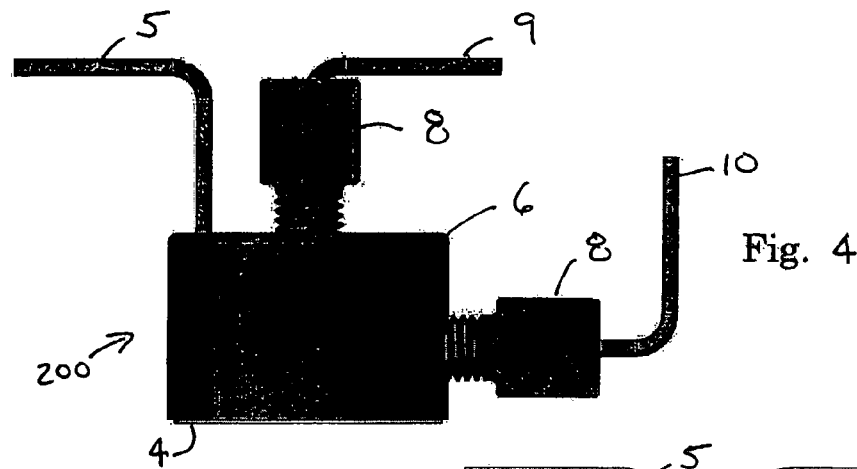
FIG. 4 illustrates a front view of a second embodiment of the chamber of the present invention.
Figure 5:
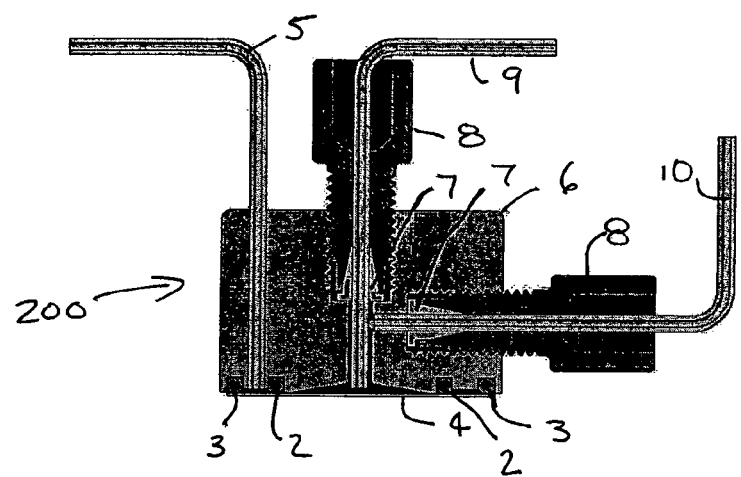
FIG. 5 illustrates a cross-sectional view of the chamber of FIG. 4.
Figure 6:
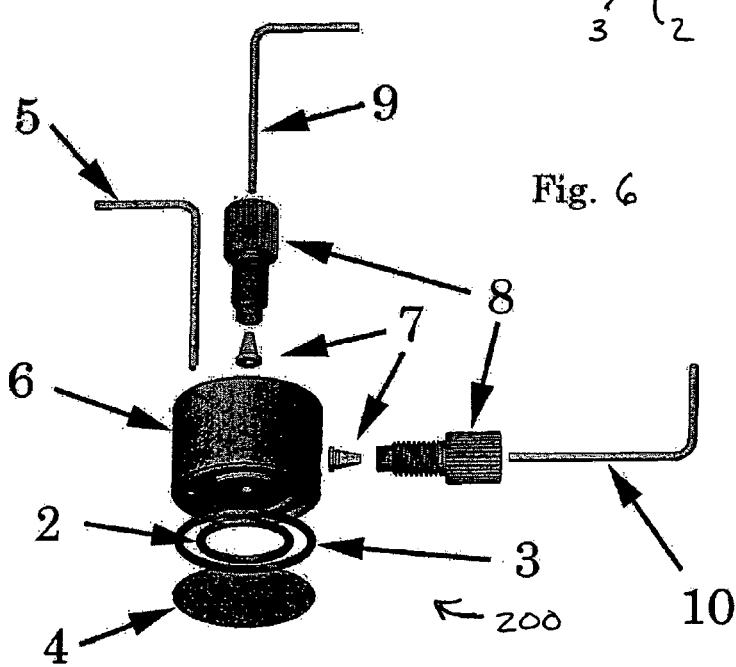
FIG. 6 illustrates an exploded view of the chamber of FIGS. 4 and 5.
Figure 7:
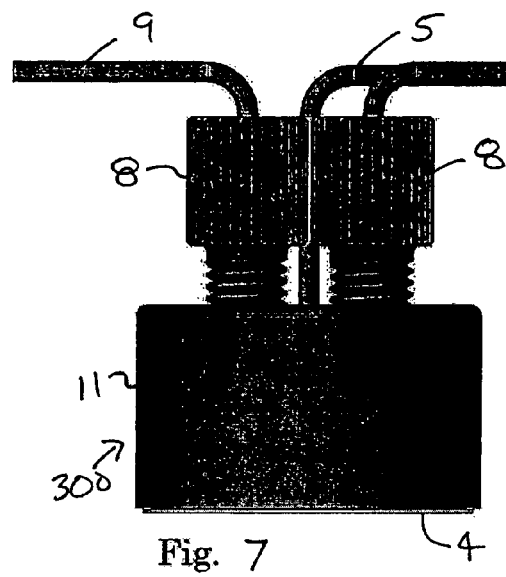
FIG. 7 illustrates a front view of a third embodiment of the chamber of the present invention.
Figure 8:
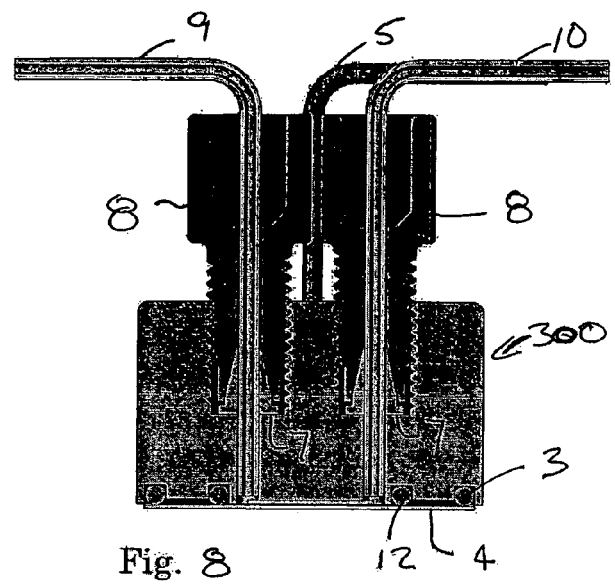
FIG. 8 illustrates a cross-sectional view of the chamber of FIG. 7.
Figure 9:
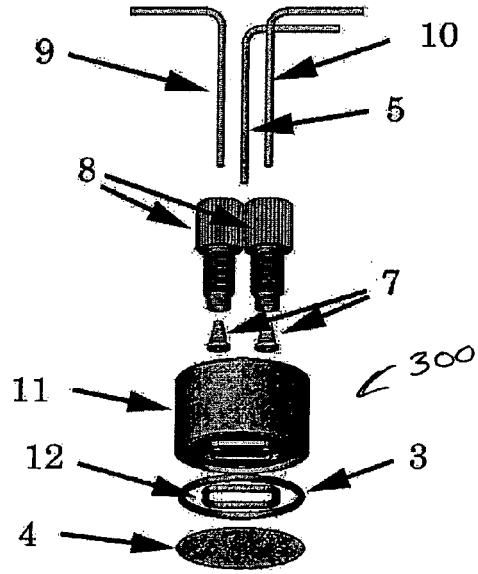
FIG. 9 illustrates an exploded view of the chamber of FIGS. 7 and 8.

Another embodiment of the chamber of the present invention is shown in FIGS. 4–6. The embodiment of the chamber shown in FIGS. 4–6 can be known or referred to as a "Round Perfusion" chamber 200. In this embodiment, a small perfusion chamber or sample well is formed between the coverslip 4 and a chamber body 6. The seal is achieved in the same manner described above with respect to chamber 100. Two concentric sealing members or O-rings 2, 3 and the application of a vacuum to the space between the sealing members 2, 3 using a vacuum connection port 5 holds the coverslip 4 in position forming a chamber or sample well in the center-most portion of the underside of body 6.

In addition to a passage or aperture for the vacuum port connection 5, as discussed above, the body 6 of perfusion chamber 200, also preferably includes a fluid path for fluid to flow into body 6 and the sample well and then to exit the sample well and the perfusion chamber 200 through either the same or a different fluid path. Fluid enters the chamber or sample well through tube 9 and leaves or exits the chamber or sample well through tube 10. In perfusion chamber 200, fluid enters the chamber from the center tube 9, where it is allowed or permitted to contact a portion of the top part or surface of the coverslip 4 within the sample well. Since it is a closed or sealed chamber, the fluid is forced upward along tube 9 and is directed out of the chamber though tube 10. In another embodiment, it is also possible to reverse the direction of the flow, e.g. fluid enters the chamber via tube 10 and leaves or exits the chamber through tube 9. Finally, in yet another embodiment, fluid can be withdrawn from one of the tubes 9, 10 by suction rather than forcing the fluid into the tube 9, 10 as discussed above. By withdrawing the fluid from the sample well, the pressure of the fluid within the chamber or sample well can be controlled more accurately.

In a preferred embodiment of the present invention, the tubes 9, 10 can be held or attached to body 6 using retaining nuts 8 and ferules 7 sized appropriately for the tubes 9, 10. The retaining nuts 8 and ferules 7 are preferably configured to hold 1/16" outer diameter tubing, but other suitable sizes of tubing or connector designs can be used to attach tubes 9, 10 in a water-tight fashion to body 6. Smaller or larger tubing diameters and other types of connectors can be used. The tubes 9, 10 could also be directly attached to body 6 using an adhesive. The material used for tubes 9, 10 and the connectors (retaining nuts 8 and ferules 7) can be made of any suitable metal or plastic.

Still another embodiment of the chamber of the present invention is shown in FIGS. 7–10. The embodiment of the chamber shown in FIGS. 7–10 can be known or referred to as a "Laminar Flow" chamber 300. A rectangular sample well or chamber is formed by the sealing of a coverslip 4 to body 11 using two sealing members 3, 12, preferably O-rings. As discussed above with regard to chambers 100 and 200, coverslip 4 forms the bottommost portion of chamber 300 and the entire bottom surface of the coverslip 4 is accessible to a user.

Figure 10:
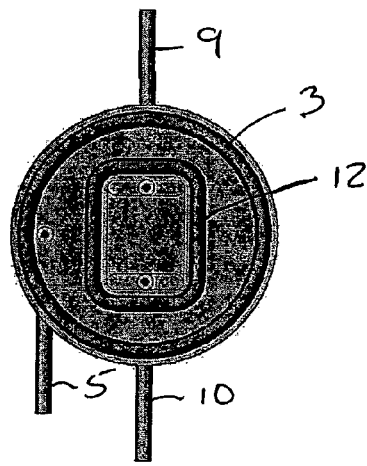
FIG. 10 illustrates a bottom view of the chamber of FIGS. 7–9.

Fluid can enter the chamber from tube 9 and leave the chamber from tube 10. As in chamber 200, the tubes 9, 10 of chamber 300 are held in position in the body 11 using two ferules 7 and two retaining nuts 8. The chamber 300 is designed in such a manner that the flow from one tube to the other tube proceeds in a laminar fashion as it proceeds or travels along the coverslip 4 in the sample well. The flow chamber or sample well is formed by the bottommost surface of the body 11, the top surface of the coverslip 4 and inner sealing member 12, which has a substantially rectangular form to seal the sample well between the coverslip 4 and the body 11. As can be seen in FIG. 10, fluid would enter into the sample well through one of the tubes 9, 10, flow across the sample well in a laminar fashion or manner and exit the sample well through the other tube 9, 10.

Figure 11:
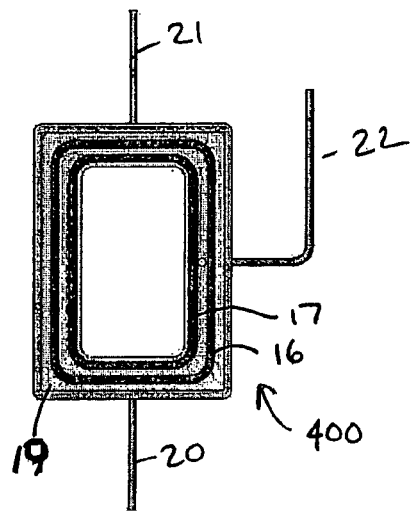
FIG. 11 illustrates a top view of a fourth embodiment of the chamber of the present invention.
Figure 12:
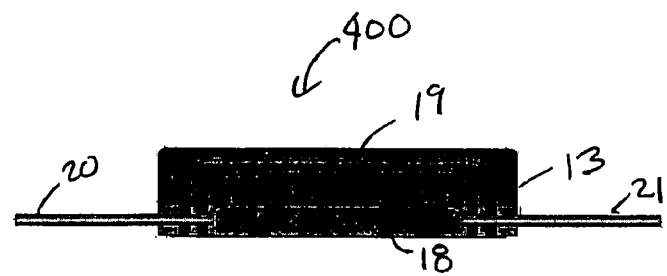
FIG. 12 illustrates a cross-sectional view of the chamber of FIG. 11.
Figure 13:
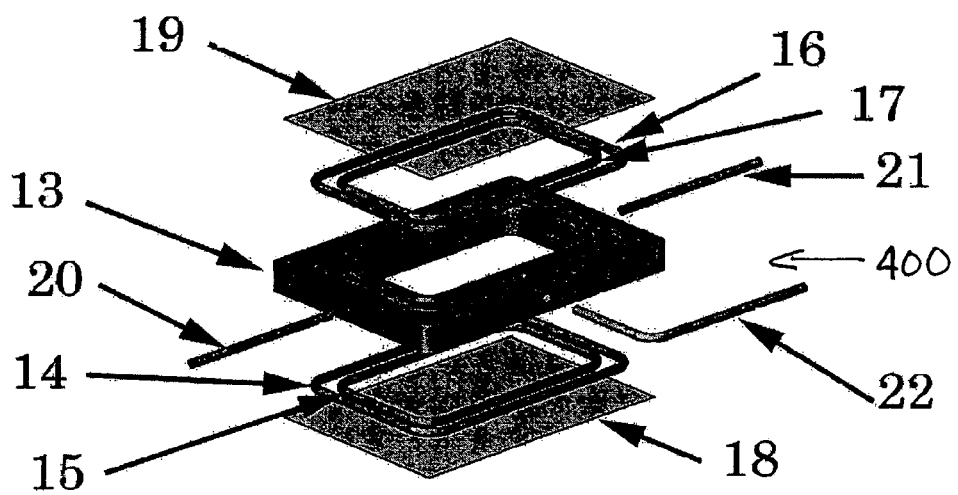
FIG. 13 illustrates an exploded view of the chamber of FIGS. 11 and 12.

Yet another embodiment of the chamber of the present invention is shown in FIGS. 11–13. The embodiment of the chamber shown in FIGS. 11–13 can be known or referred to as a "Window Perfusion" chamber 400. This embodiment of the present invention has two sets of O-rings 14, 15 and 16, 17 and two coverslips 18, 19 that are connected to body 13 to form perfusion chamber 400. Upon application of a vacuum force to vacuum port connection 22, the two coverslips 18, 19, are connected to the body 13 and form an observation window to the sample well on both sides of the body 13 that permits direct viewing or measurement of the contents or specimens in the sample well between coverslips 18 and 19. Samples, specimens or experimental fluids are introduced, and permitted to flow through the chamber or sample well via tubes 20, 21. The tubes 20, 21 and the vacuum port connection 22 are preferably held in place with an adhesive, but can be held in place with the retaining nuts and ferules discussed above or with any other suitable type of connector. Furthermore, coverslips 18, 19 are held in position by a suction connection force, as discussed above, that is provided by vacuum connection port 22. In FIGS. 11–13, both coverslips 18, 19 are held in position by a common vacuum connection port, however, the coverslips 18, 19 can be held in position using separate suction ports for each coverslip 18, 19.

Figure 16:
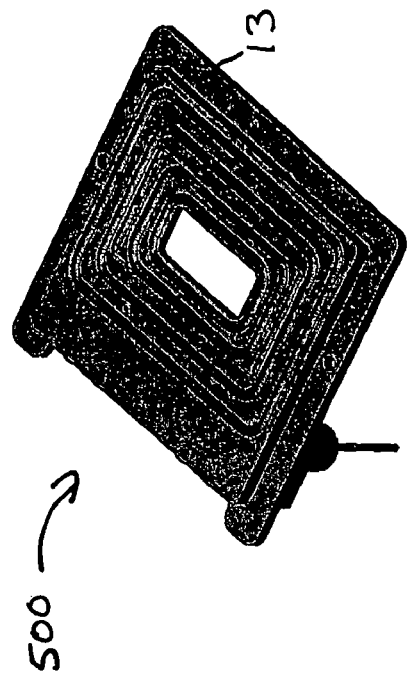
FIG. 16 illustrates a bottom view of the chamber of FIGS. 16 and 17 without coverslips.
Figure 15:
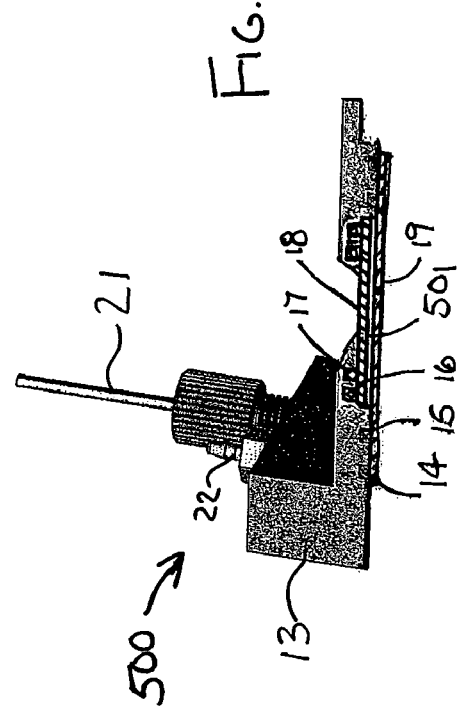
FIG. 15 illustrates a cross-sectional view of the chamber of FIG. 16.
Figure 14:
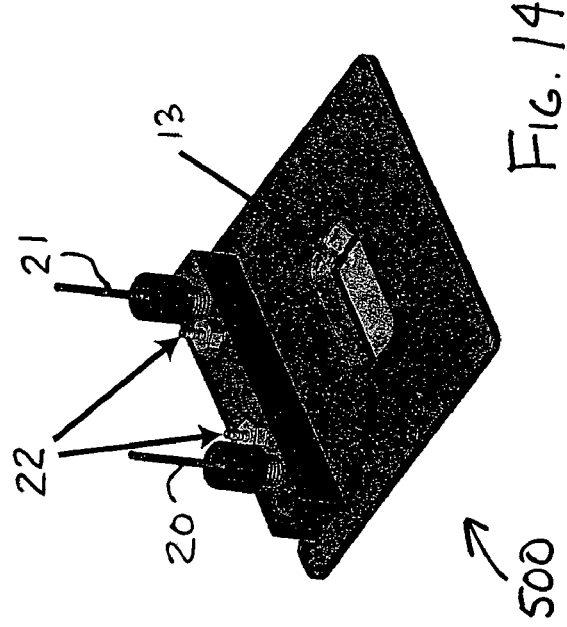
FIG. 14 illustrates a top view of a fifth embodiment of the chamber of the present invention.

In still another embodiment of the present invention, multiple pairs of sealing elements can be positioned concentric to each other to permit optical elements or coverslips to be stacked on one another to form a thin perfusion chamber. FIGS. 14–16 illustrate one embodiment of the present invention having multiple pairs of sealing elements for forming a chamber that can be known or referred to as a "Thin Perfusion" chamber 500. This embodiment of the present invention has two sets of O-rings 14, 15 and 16, 17 and two coverslips 18, 19 that are connected to body 13 to form perfusion chamber 500. Upon application of a vacuum force to vacuum port connections 22, the two coverslips 18, 19, are connected to the body 13 and form a thin chamber 501 between coverslips 18 and 19. The thin chamber can preferably be 0.01 inches thick, although other the chamber may have other thicknesses. Samples, specimens or experimental fluids are introduced, and permitted to flow through the thin chamber 501 via tubes 20, 21. Furthermore, coverslips 18, 19 are held in position by a suction connection force, as discussed above, that is provided by vacuum connection ports 22. In FIGS. 14–16, each coverslip 18, 19 is held in position by a separate vacuum connection port 22, however, the coverslips 18, 19 can be held in position using a common vacuum suction port 22.

In another embodiment of the present invention, the sealing elements can be a strip or ring of adhesive or other similar type of material. Depending on the type of adhesive, coverslip, and body that is used, more than one ring or strip of adhesive or other material can be used. The use of the adhesive instead of the O-rings and vacuum port connection as discussed above can provide for a quick formation of the chamber and the sample well. The adhesive rings or strips can be applied to either the coverslip, the body of the chamber or both. Furthermore, depending on the properties of the adhesive, the coverslip may be removed or detached without breaking the coverslip or body. In addition, the adhesive rings can preferably form a watertight seal between the coverslip and body, if samples, specimens or experimental fluids are to be introduced, and permitted to flow through the chamber or sample well.

Figure 17:
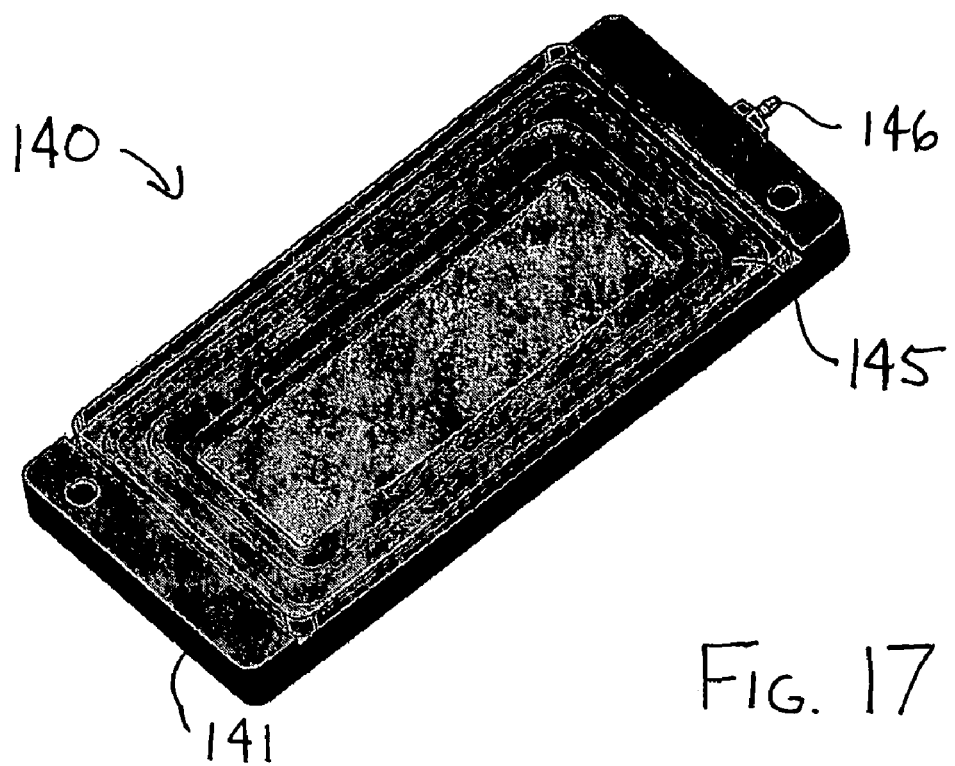
FIG. 17 illustrates an isometric view of a hybridization chamber using the connection arrangement of the present invention.
Figure 18:
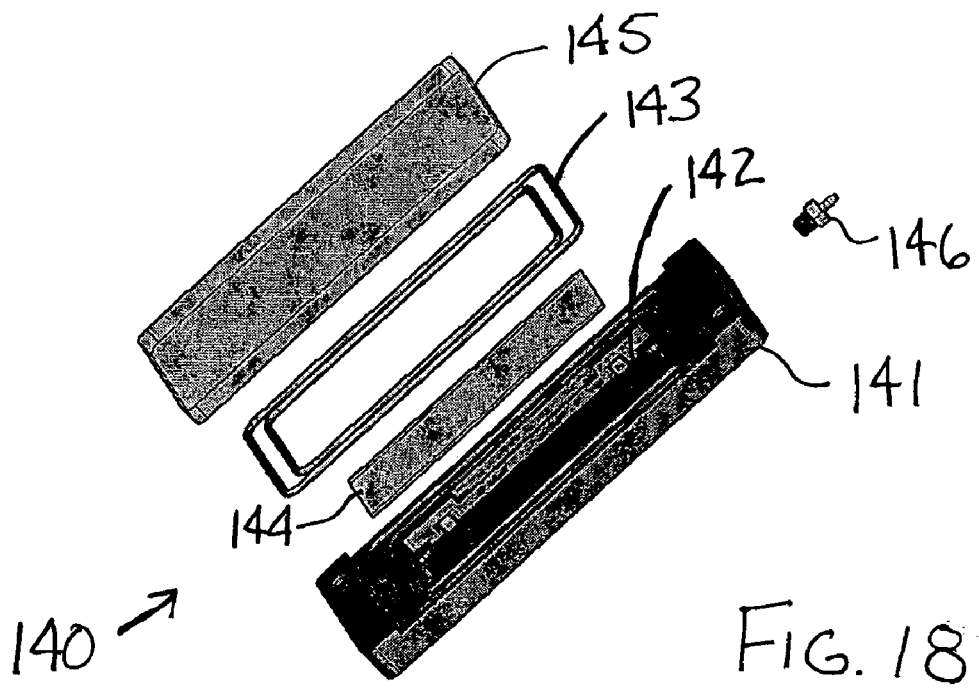
FIG. 18 illustrates an exploded view of the hybridization chamber of FIG. 17.

In still another embodiment of the present invention, the dual sealing element connection configuration can be used with a hybridization chamber. FIGS. 17 and 18 illustrate one embodiment of a hybridization chamber using the dual sealing element connection configuration of the present invention. The hybridization chamber 140 is used for performing "hybridization" reactions and can be closed or isolated from the environment to maintain a substantially constant humid atmosphere in the chamber. In another embodiment, the hybridization chamber 140 can also provide a constant temperature in the chamber.

The hybridization chamber 140 includes a chamber body 141 with an open chamber, cavity or trough 142 located in substantially the center of the chamber body 141. In one embodiment of the present invention, an optical element 144 can be positioned in the bottom of the open chamber 142. However, optical element 144 is not required. A pair of sealing elements 143, preferably O-rings, are concentrically positioned around the open chamber 142. An optical element 145 is placed on the chamber body 141 over the open chamber 142 and the surrounding sealing elements 143. The optical element 145 is preferably a clear sheet of acrylic material, polycarbonate material or other suitable material to permit observation of the contents of the open chamber 142.

Similar to the chambers discussed above, the optical element 145 is connected to the chamber body 141 by applying a vacuum or suction force between the concentric sealing elements 143. The vacuum force is applied through a vacuum port connection 146 that is connected to a vacuum or suction force (not shown). The chamber body 141 has an aperture or passageway through which the vacuum port connection 146 passes to access the space between the sealing elements 143. The application of the vacuum force to vacuum port 146 permits the evacuation of air from the space between the sealing elements 143, thereby forming a suction connection that compresses sealing elements 143 and holds optical element 145 in a position adjacent to the chamber body 141 to close or seal open chamber 142, thereby forming the hybridization chamber 100.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sample chamber for a test specimen, the sample chamber comprising:
   a main body;
   an optical element, the optical element having a surface for holding a test specimen, the optical element being operatively connected to the main body by a force applied to the surface for holding the test specimen;
   means for applying a force to a continuous portion of the surface for holding the test specimen of the optical element to operatively connect the optical element to the main body, the means for applying a force comprising at least one sealing element, the at least one sealing element being configured and disposed between the main body and the optical element;
   the main body, the optical element and the at least one sealing element form a sample well upon the optical element being operatively connected to the main body by the means for applying a force; and
   wherein the optical element being disposed to form a bottommost portion of the sample chamber, the at least one sealing element comprises at least two sealing elements, and the at least two sealing elements are disposed substantially concentrically and the means for applying a force further comprises a vacuum connection, the vacuum connection being configured and disposed to provide a vacuum force between the at least two sealing elements to operatively connect the optical element to the main body using the vacuum force.

2. The sample chamber of claim 1 wherein the optical element is configured to permit visual inspection of a test specimen in the sample well.

3. The sample chamber of claim 1 wherein the at least two sealing elements comprises one of at least two O-rings, at least two gaskets or at least two washers.

4. The sample chamber of claim 1 further comprising:
   at least one tube being configured and disposed to add or withdraw samples or specimens from the sample well; and
   wherein the main body comprises at least one aperture in communication with the sample well and the at least one tube is at least partially disposed in the at least one aperture.

5. The sample chamber of claim 4 further comprising means for attaching the at least one tube to the at least one aperture in the main body.

6. The sample chamber of claim 5 wherein:
   the at least one aperture comprises a first aperture and a second aperture; and
   the at least one tube comprises a first tube attached to the first aperture to add samples or specimens to the sample well and a second tube attached to the second aperture to withdraw samples or specimens from the sample well.

7. The sample chamber of claim 6 wherein the first aperture and the second aperture are disposed on opposite sides of the sample well to provide for substantially laminar flow of samples or specimens through the sample well.

8. The sample chamber of claim 1 wherein:
   the main body comprises one of a plastic material or a metallic material; and
   the optical element comprises one of a glass material or a plastic material.

9. The sample chamber of claim 1 wherein the optical element is coated with at least one of an electrical conductivity coating material, an antireflective coating material or a transmission enhancing coating material.

10. The sample chamber of claim 1 wherein the at least one sealing element is at least one adhesive ring.

11. A sample chamber for a test specimen, the sample chamber comprising:
    a main body;
    at least one optical element, the at least one optical element having a surface for holding a test specimen, the at least one optical element being operatively connected to the main body by a force applied to the surface for holding the test specimen;
    means for applying a force to a continuous portion of the surface for holding the test specimen of the at least one optical element to operatively connect the at least one optical element to the main body, the means for applying a force comprising at least two sealing elements, the at least two sealing elements being configured and disposed substantially concentrically and between the main body and the at least one optical element;
    the main body, the at least one optical element and the at least two sealing elements form a sample well upon the at least one optical element being operatively connected to the main body by the means for applying a force; and
    wherein the means for applying a force further comprises a vacuum connection, the vacuum connection being configured and disposed to provide a vacuum force between the at least two sealing elements to operatively connect the at least one optical element to the main body using the vacuum force.

12. The sample chamber of claim 11 wherein the vacuum connection comprises:
    an aperture in the main body in communication with a space between the at least two sealing elements;
    a connection port at least partially disposed in the aperture; and
    means for attaching the connection port to the aperture in the main body.

13. A chamber comprising:
    a body;
    at least one optical element, the at least one optical element being operatively connectable to the body upon a force being applied to a planar surface of the at least one optical element;
    a connecting arrangement to connect the at least one optical element to the body upon a vacuum force being applied to the connecting arrangement and the planar surface of the at least one optical element, the connecting arrangement comprising at least one pair of sealing elements, the at least one pair of sealing element being disposed substantially concentrically to form a space between the at least one pair of sealing elements, the at least one pair of sealing elements being disposed between the body and the at least one optical element; and
    wherein the body, the at least one optical element and the at least one pair of sealing elements form a chamber upon a vacuum force being applied to the connecting arrangement and the planar surface of the at least one optical element to connect the at least one optical element to the body.

14. The chamber of claim 13 wherein the connecting arrangement further comprises:

the body having an aperture in communication with the space between the at least one pair of sealing elements;

a connection port at least partially disposed in the aperture; and means for attaching the connection port to the aperture in the body.

15. The chamber of claim 14 wherein:

the at least one optical element comprises a first optical element and a second optical element, the first optical element being disposed opposite the second optical element to form two sides of the chamber; and the at least one pair of sealing elements comprises a first pair of sealing elements and a second pair of sealing elements.

16. The chamber of claim 15 wherein the first optical element and the first pair of sealing elements are disposed on opposite sides of the body from the second optical element and the second pair of sealing elements.

17. The chamber of claim 15 wherein the first optical element and the first pair of sealing elements and the second optical element and the second pair of sealing elements are disposed on one side of the body.

18. The chamber of claim 13 further comprising:

the body having a first aperture and a second aperture in communication with the chamber;

a first tube at least partially disposed in the first aperture to add samples or specimens to the chamber; and a second tube at least partially disposed in the second aperture to withdraw samples or specimens from the chamber.

19. The chamber of claim 13 wherein the chamber formed by the body, the at least one optical element and the at least one pair of sealing elements upon application of a vacuum force is a hybridization chamber.

* * * * *